United States Patent
Ho

(10) Patent No.: US 7,841,254 B2
(45) Date of Patent: Nov. 30, 2010

(54) ALL-TERRAIN VEHICLE GEAR-SHIFTING SAFETY DEVICE

(75) Inventor: Chao-Chang Ho, Kaohsiung (TW)

(73) Assignee: Kwang Yang Motor Co., Ltd., Kaohsiung (TW)

( * ) Notice: Subject to any disclaimer, the term of this patent is extended or adjusted under 35 U.S.C. 154(b) by 320 days.

(21) Appl. No.: 12/108,527

(22) Filed: Apr. 24, 2008

(65) Prior Publication Data
US 2009/0025497 A1    Jan. 29, 2009

(30) Foreign Application Priority Data
Jul. 26, 2007    (TW) .............................. 96127343 A

(51) Int. Cl.
*F16H 59/00*    (2006.01)
(52) U.S. Cl. ..................................... 74/337.5
(58) Field of Classification Search ....................... None
See application file for complete search history.

(56) References Cited

U.S. PATENT DOCUMENTS

| | | | | |
|---|---|---|---|---|
| 4,574,652 A | * | 3/1986 | Shichinohe et al. ...... | 74/473.21 |
| 4,624,350 A | * | 11/1986 | Akashi ......................... | 192/220 |
| 4,730,506 A | * | 3/1988 | Kageyama .................. | 74/337.5 |
| 4,754,662 A | * | 7/1988 | Misawa .................... | 74/473.22 |
| 6,595,078 B2 | * | 7/2003 | Arakawa .................... | 74/337.5 |
| 6,802,233 B2 | * | 10/2004 | Hori et al. ................... | 74/730.1 |
| 2009/0107277 A1 | * | 4/2009 | Ennsmann ............... | 74/473.22 |

* cited by examiner

*Primary Examiner*—Dirk Wright
(74) *Attorney, Agent, or Firm*—Leong C. Lei

(57) ABSTRACT

A gear-shifting safety device is provided for an all-terrain vehicle (ATV), including a gear lever, a gear-shifting hub shaft, a gear-shifting gear set, and a reversing bar. An end of the gear-shifting hub forms a step on which a block is provided. The block and the step form a stop face therebetween. The reversing bar has an end forming a stop section that is positionable on the step and is selectively in abutting engagement with the stop face so that to change to the reversing position, the reversing bar must be first actuated to disengage the stop section thereof from the stop face, allowing the switching fork to move to the reversing position on a position chute of the gear-shifting hub, thereby eliminating the damage of accidentally switching to reversing during the forward movement of the vehicle.

1 Claim, 7 Drawing Sheets

ALL-TERRAIN VEHICLE GEAR-SHIFTING SAFETY DEVICE

BACKGROUND OF THE INVENTION (a) Technical Field of the Invention

The present invention relates to an all-terrain vehicle (ATV) gear-shifting safety device, and in particular to a structure that comprises a reversing bar arranged at an end of a gear-shifting hub shaft to prevent a moving vehicle from error operation of accidentally switching to the reversing position, which may lead to undesired damages.

(b) Description of the Prior Art

Forward movement and reversed movement of an all-terrain vehicle (ATV) are controlled by a gear-shifting mechanism. As shown in FIG. 4, a regular gear-shifting mechanism is arranged inside an engine 1. The engine 1 is operated by an ignition device 11 that ignites the combustion of an air and fuel mixture inside a combustion chamber 12 for driving reciprocal movement of a piston 13. The piston 13 in turn drives the rotation of a crankshaft 14. The crankshaft 14 is provided with a gear 141 engaging a clutch 15 for driving the rotation of the clutch 15. The clutch 15 is provided with a transmission shaft 151, which is provided with a transmission gear 1511 engaging a gear-shifting gear 161 mounted on a gear-shifting gear shaft 16. To change speeds, a gear lever (not shown) causes a gear-shifting hub 171 mounted on a gear-shifting hub shaft 17 to rotate whereby a switching fork 1621 of a fork guide rod 162 moves into the position chute 1711 provided on the gear-shifting hub 171 to effect gear shifting.

The conventional gear shifting mechanism is effective in shifting gear to the desired position. However, when the ATV needs to reverse by switch the gear-shifting mechanism to the reversing position, the power transmission is cut off to set the clutch 15 in an idle condition, but the vehicle is still in movement due to the inertia thereof. If the gear lever is forced to the reversing position, the switching fork 1621 of the switching fork guide rod 162 is moved to the reversing position of the position chute 1711 of the gear-shifting hub 171, while the vehicle is still in forward movement, so that the instantaneous switching to the reversing condition may cause risk and may even damaging the gear-shifting gear 161 of the gear-shifting gear shaft 16.

SUMMARY OF THE INVENTION

The primary purpose of the present invention is to provide a gear-shifting safety device for an all-terrain vehicle (ATV), which comprises a gear lever, a gear-shifting hub shaft, a gear-shifting gear set, and a reversing bar. The gear lever comprises a gear that mates a gear of the gear-shifting hub shaft for driving the rotation of a gear-shifting hub. The gear-shifting gear set is provided with a switching fork guide rod. The gear lever is operative to cause the gear-shifting hub of the gear-shifting hub shaft to rotate and a switching fork of the switching fork guide rod is moved to a position chute on the gear-shifting hub for changing gears. An end of the gear-shifting hub forms a step on which a block is provided. The block and the step form a stop face therebetween. The reversing bar has an end forming a stop section that is positionable on the step and is selectively in abutting engagement with the stop face so that to change to the reversing position, the reversing bar must be first actuated to disengage the stop section thereof from the stop face, allowing the switching fork to move to the reversing position of the position chute of the gear-shifting hub, thereby eliminating the damage of accidentally switching to reversing during the forward movement of the vehicle.

Another objective of the present invention is to provide a gear-shifting safety device for an all terrain vehicle, wherein the reversing bar is connected to a control member and the control member is connected to a control mechanism of the vehicle. The control mechanism can be a rotary knob. When to switch to the reversing position, the control mechanism is rotated to have the control member moving the reversing bar, causing the stop section of the reversing bar to disengage from the stop face. As such, damages caused by accidentally switching to reversing during the forward movement of the vehicle are eliminated.

The foregoing object and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENTS

The following descriptions are of exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Figure 1:
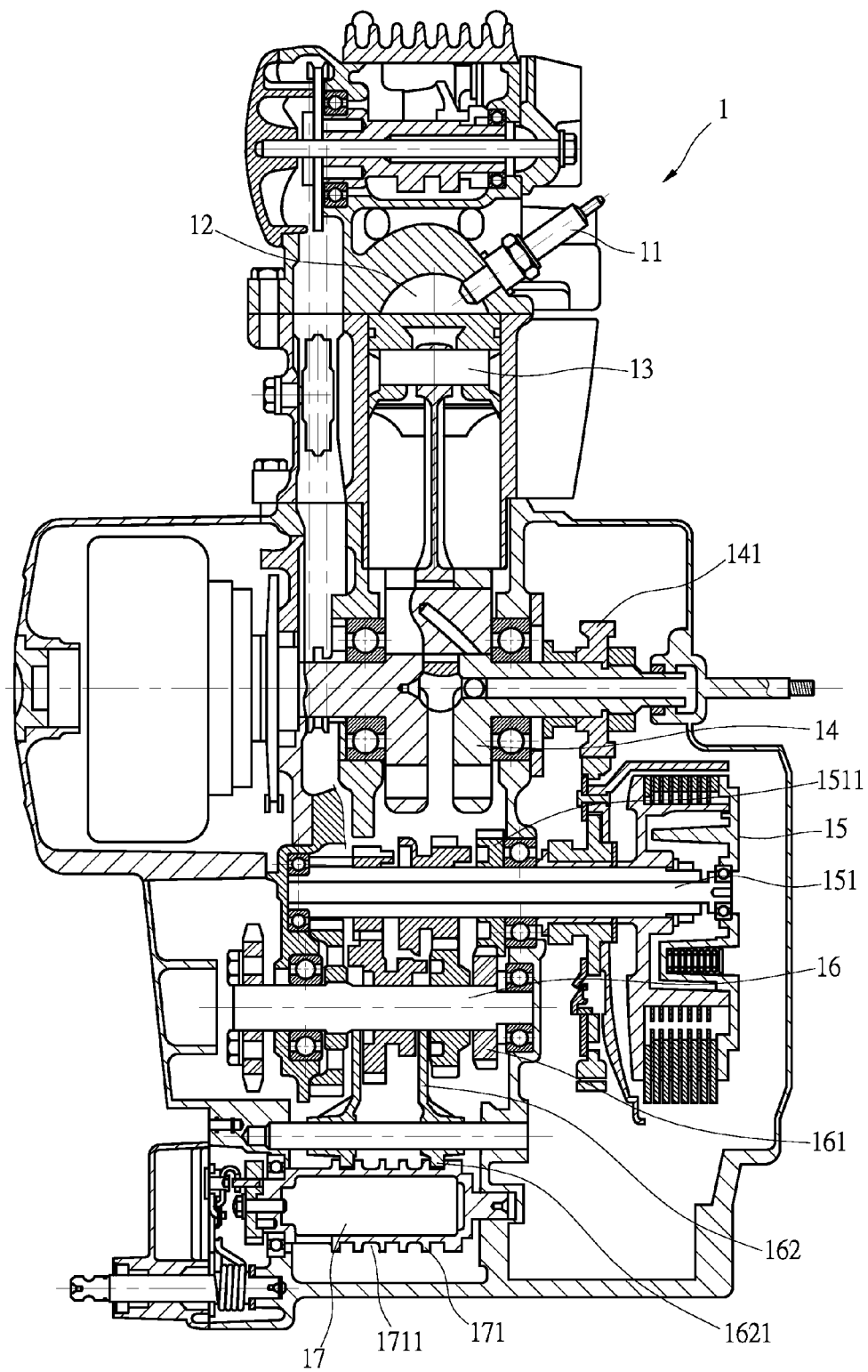
FIG. 1 is a schematic cross-sectional view of a conventional gear-shifting mechanism of an all-terrain vehicle (ATV)
Figure 2:
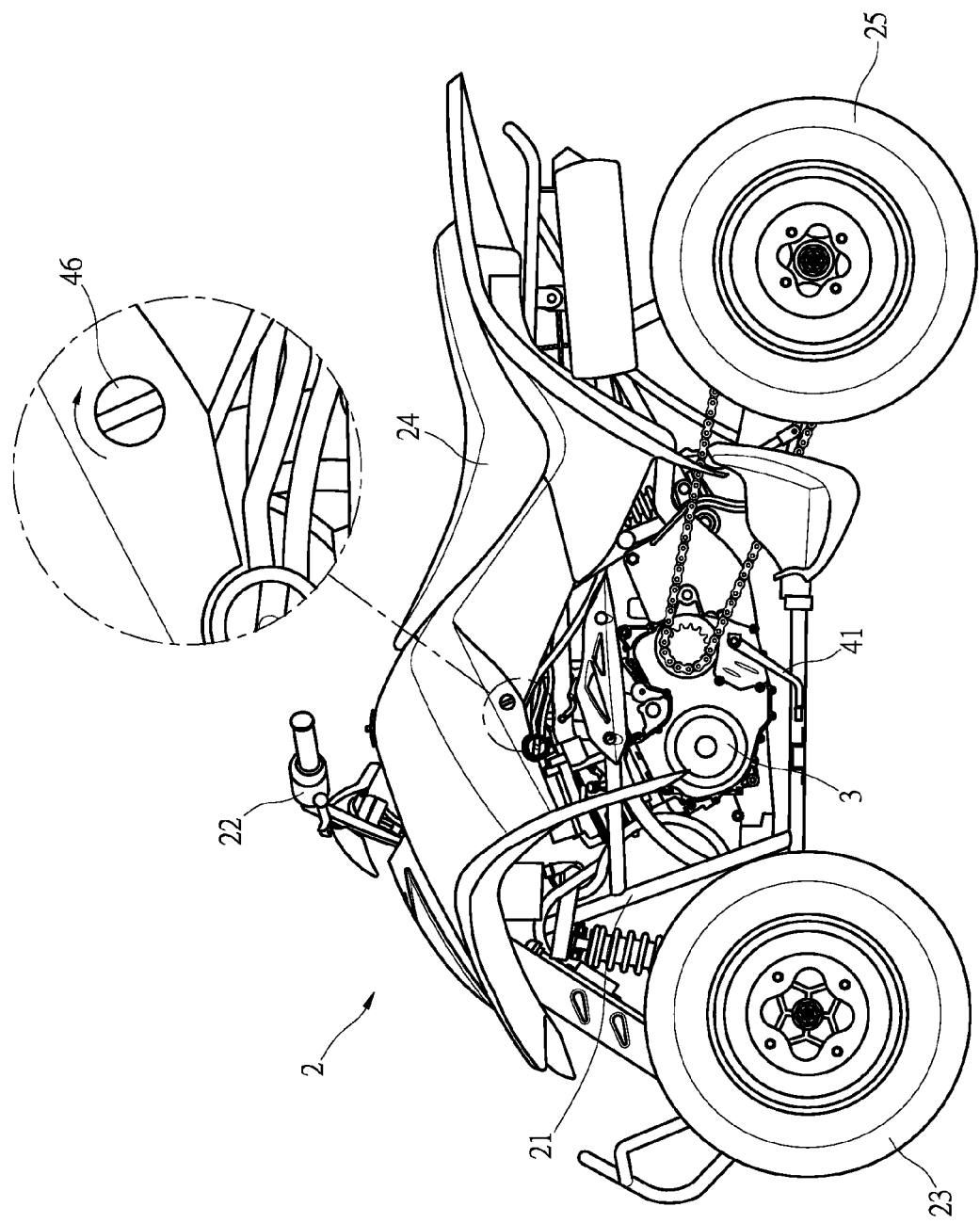
FIG. 2 is a side elevational view of an ATV in accordance with the present invention.

With reference to the drawings and in particular to FIG. 2, an all-terrain vehicle (ATV), generally designated at 2, comprise a frame 21, a steering mechanism 22, front wheel(s) 23, a saddle or seat 24, and rear wheel(s) 25, and a power unit 3 that supplies power to the ATV. The steering mechanism 22 is pivotally mounted to a front end of the frame 21 and a set of front wheels 23 are mounted below the steering mechanism 22. The seat 24 is provided on the frame 21 and behind the steering mechanism 22. The power unit 3 is below the seat 24.

Figure 3:
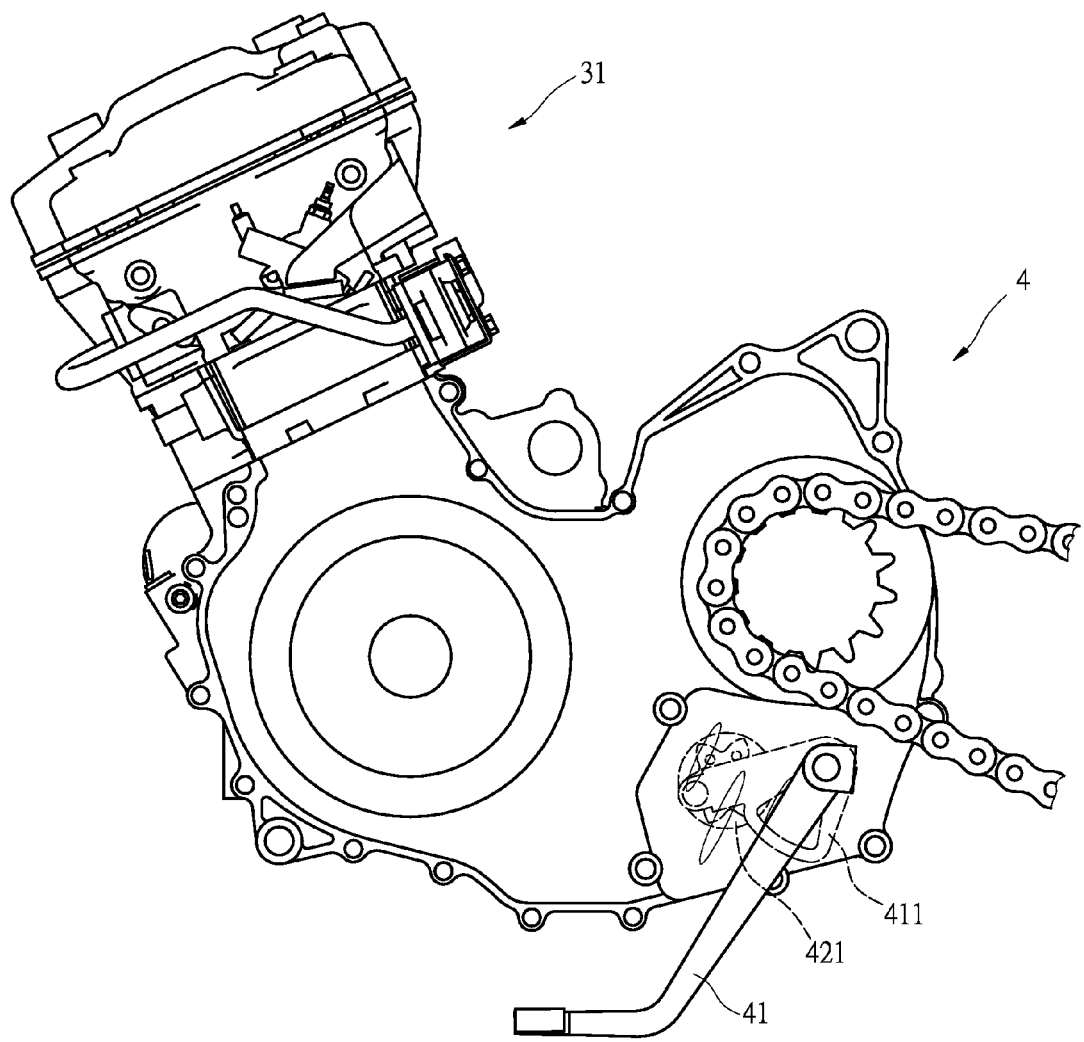
FIG. 3 is a schematic view illustrating a gear-shifting mechanism in accordance with the present invention.
Figure 4:
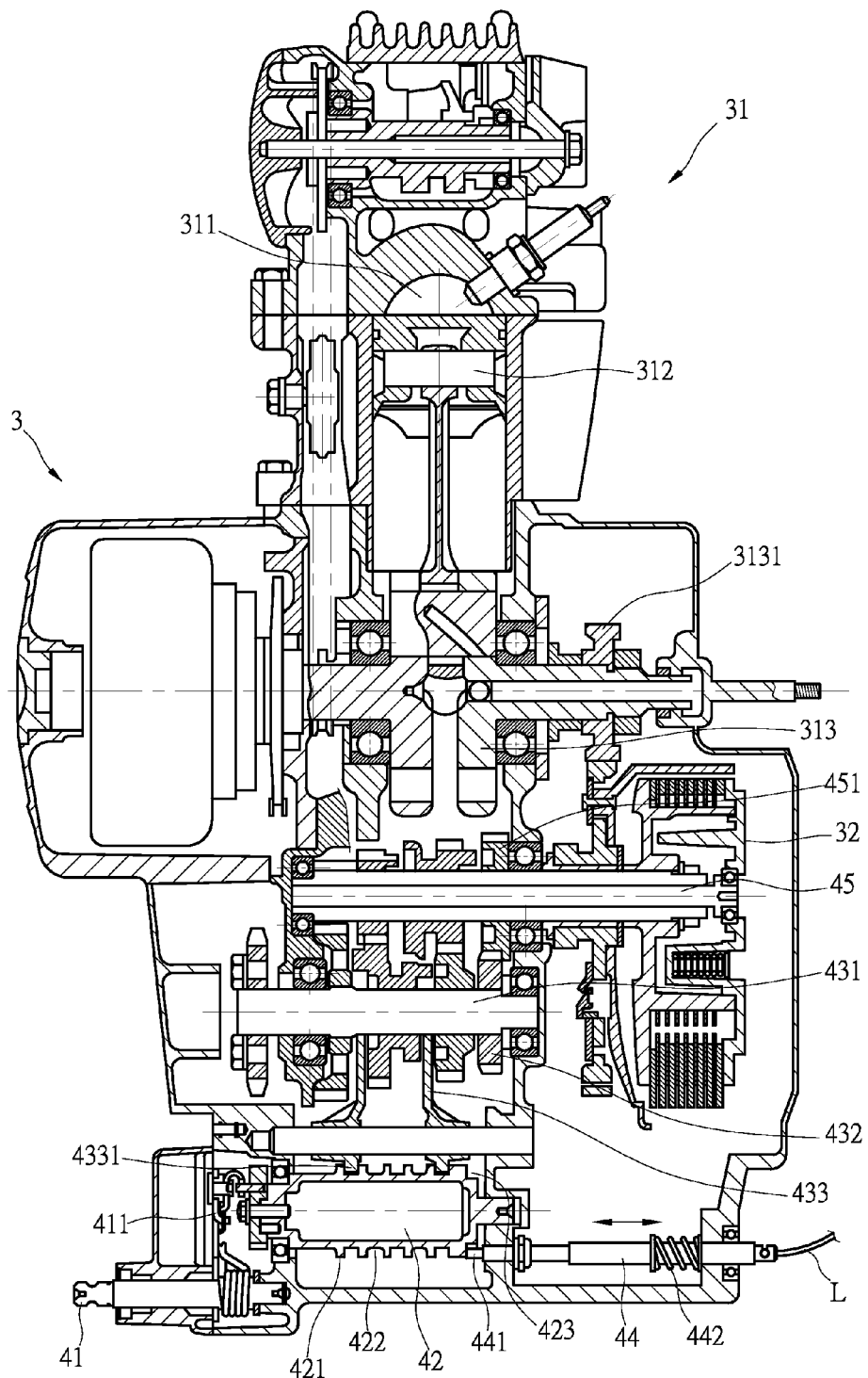
FIG. 4 is a cross-sectional view of an engine and the gear-shifting mechanism in accordance with the present invention.

Also referring to FIGS. 3 and 4, the ATV 2 comprises a gear-shifting mechanism 4 for driving the vehicle in a forward or reversed direction. The gear-shifting mechanism 4 in accordance with the present invention comprises a gear-shifting lever 41, a gear-shifting hub shaft 42, a gear-shifting gear set 43 and a reversing bar 44.

Figure 5:
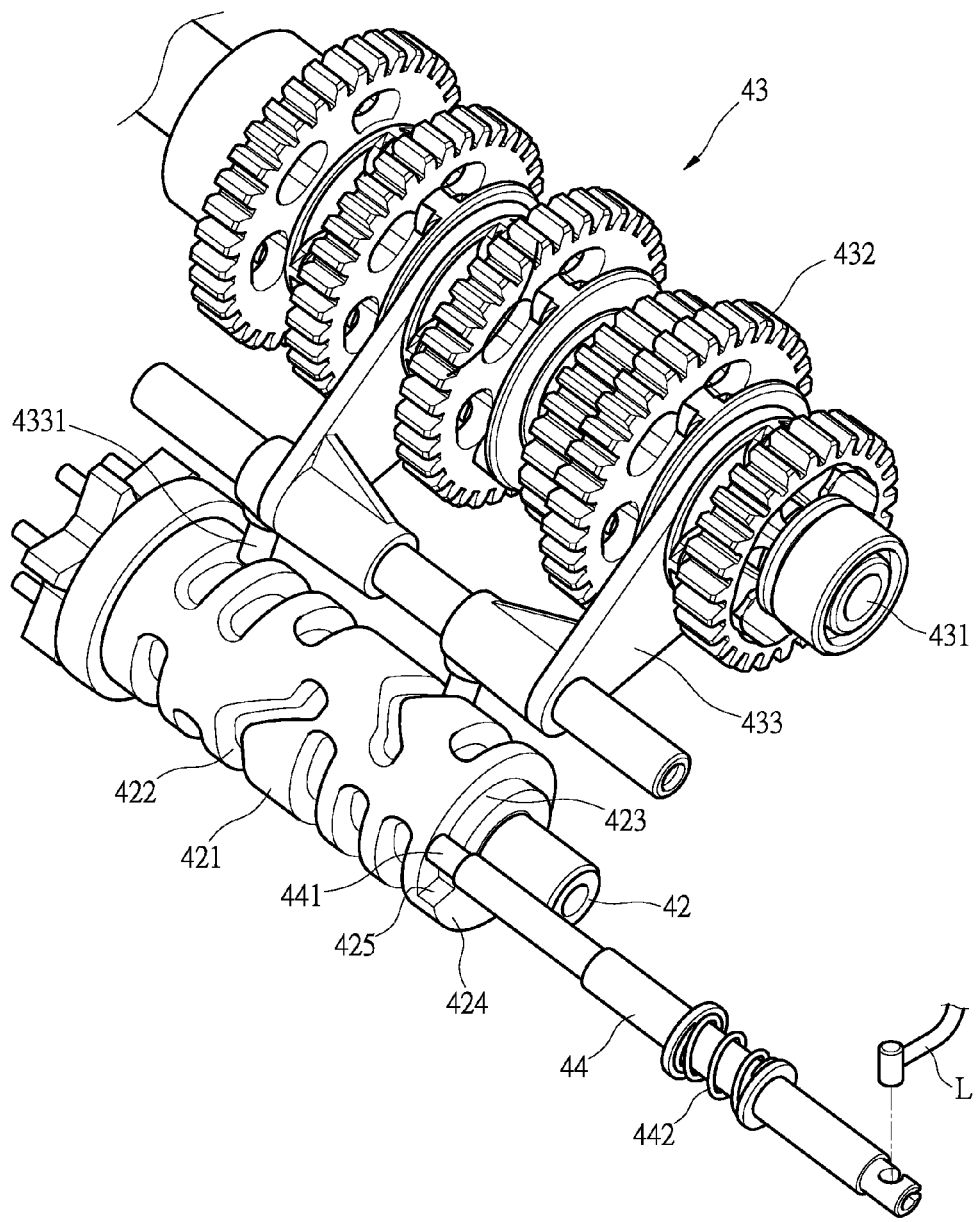
FIG. 5 is a perspective view of the gear-shifting mechanism of the present invention.

The gear-shifting lever 41 is operative to cause a link bar 411 to drive a gear-shifting hub 421 arranged on the gear-shifting hub shaft 42. The gear-shifting hub 421 is movable on the gear-shifting hub shaft 42 in a left-right direction. The gear-shifting hub 421 forms a position chute 422 that defines a plurality of operation positions, including a forward position, a neutral position, and a reversing position. As shown in FIG. 5, the gear-shifting hub shaft 42 has an end at which a circumferential step 423 is formed. The step 423 is provided with a block 424 so that a stop face 425 is formed between the block 424 and the step 423.

The gear-shifting gear set 43 comprises a shaft 431 on which a plurality of gear-shifting gears 432 and a switching fork guide rod 433 are provided. The plurality of gear-shifting gears 432 are of different sizes and have different numbers of teeth engageable with the transmission gear 451 of the transmission shaft 45 to generate different gear ratios for output of different torques. The switching fork guide rod 433 forms a switching fork 4331 that is fit in the position chute 422 of the gear-shifting hub 421.

The reversing bar 44 has an end extending out of the power unit 3 to be controlled by a control member L for movement in left-right direction. The control member L is coupled to a control mechanism 46 of the vehicle, which is best seen in the enlarged portion of FIG. 2. The control mechanism 6 can be for example a rotary knob in an actual embodiment. An opposite end of the reversing bar 44 is located inside the power unit 3. The reversing bar 44 has a stop section 441 that is positioned on the step 423 of the gear-shifting hub shaft 42 and is engageable with the stop face 425. The reversing bar 44 comprises a resilient element 442, which provides the reversing bar 44 with a resilient return force.

Referring to FIG. 4, in a regular way of starting the engine system 31 of the power unit 3, the engine system 31, due to the power generated by the combustion of fuel occurring inside the combustion chamber 311, moves the piston 312 in a reciprocal manner for driving the rotation of the crankshaft 313. The crankshaft 313 causes the gear 3131 to rotate in unison therewith and then causes the rotation of the clutch 32. The clutch 32 in turn drives the transmission shaft 45. The gear 451 on the transmission shaft 45 is mateable with different gear-shifting gears 432 of the gear-shifting gear set 43 so that when there is a need to change speed by switching to different gear-shifting positions, the gear lever 41 is actuated to cause the movement of the gear-shifting hub 421 on the gear-shifting hub shaft 42 in the left-right direction and the switching fork 4331 is displaced to a desired position on the position chute 422 of the gear-shifting hub 421 to thereby switching the ATV 2 to different speeds.

Figure 6:
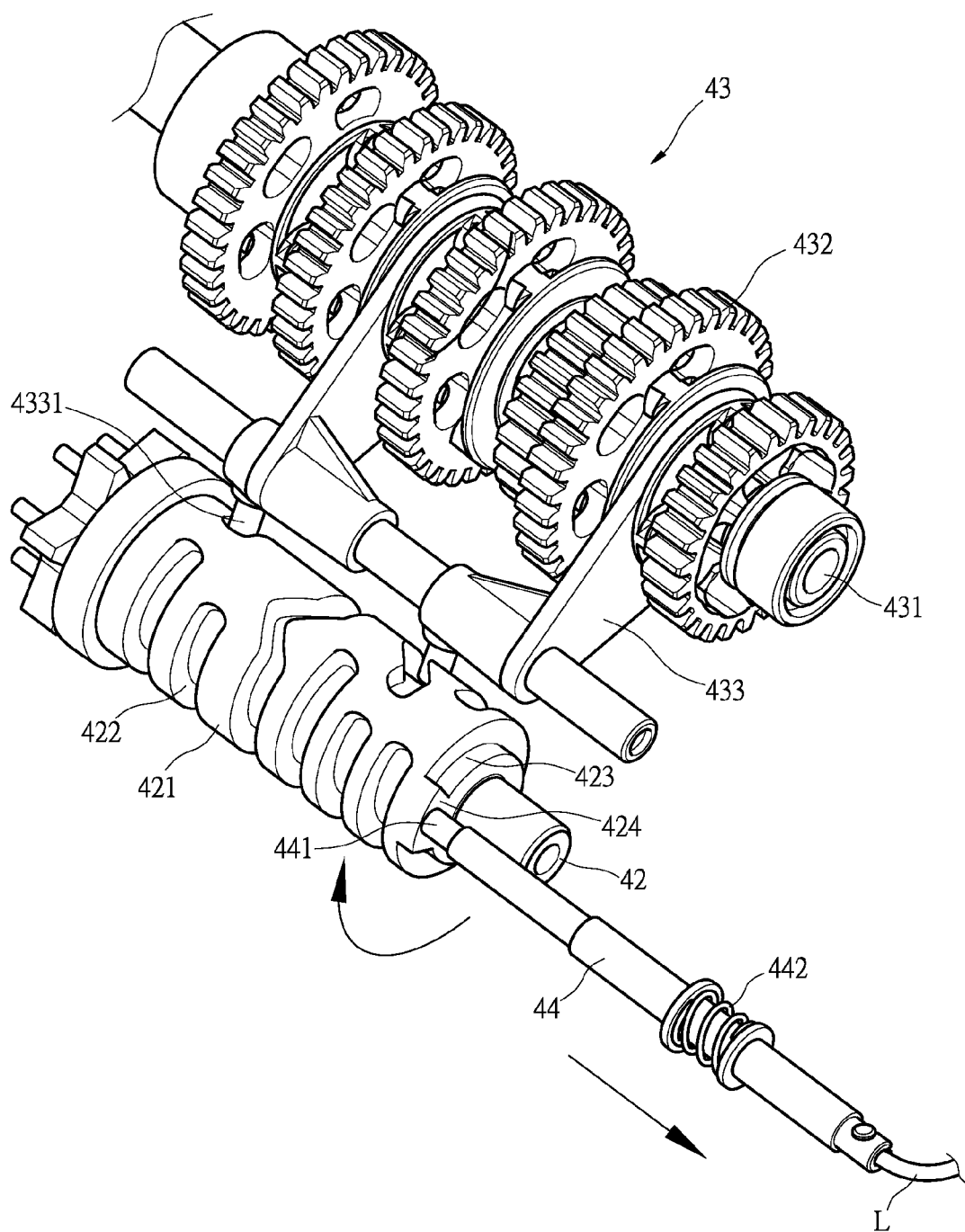
FIG. 6 is a perspective view showing the operation of the gear-shifting mechanism of the present invention.
Figure 7:
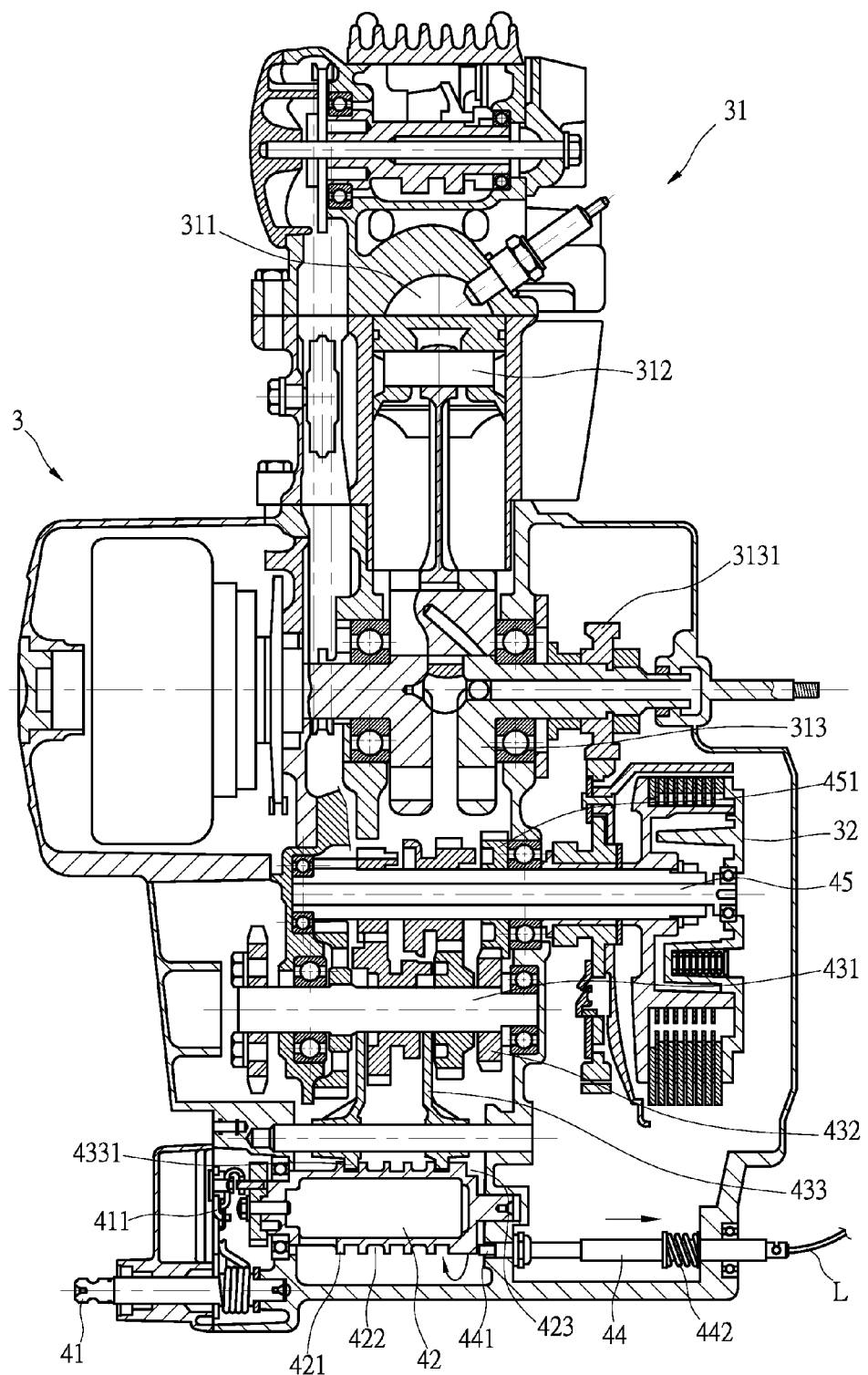
FIG. 7 schematically shows an application of the engine and gear-shifting mechanism of the present invention.

Also referring to FIGS. 5-7, when the ATV 2 is to be switched to the reversing position, the control mechanism 46 (see the enlarged portion of the FIG. 2) is first rotated to have the control member L moves the reversing bar 44, making the stop section 441 of the reversing bar 44 disengaging from the stop face 425. At this time, the gear lever 41 can be operated to move to the reversing position and the reversing position of the position chute 422 of the gear-shifting hub 421 is set to engage the switching fork 4331 so that the reversing gear of the gear-shifting gear set 43 is set to mate the gear 451 of the transmission shaft 45 to allow the ATV 2 to reverse.

The effectiveness of the present invention is that an end of the gear-shifting hub shaft 42 is provided with a reversing bar 44. The gear-shifting hub shaft 42 forms a step 423 and a block 424 between which a stop face 425 is formed for engaging and in mutual-abutting with the stop section 441 of the reversing bar 44 to set a constrain. To change to the reversing position, the control mechanism 46 must be first rotated to have the control member L to drive the reversing bar 44 for removing the constraint, and then the position chute 422 of the gear-shifting hub 421 is allowed to rotate the reversing position for effecting reversing of the vehicle. In this way, instantaneously changing to the reversing position at the time when the vehicle is still moving forward and thus causing risks can be eliminated. In addition, arranging the reversing bar 44 at an end of the gear-shifting hub shaft 42 makes the installation easy and does not occupy additional space inside the engine system 31.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

I claim:

1. In an all-terrain vehicle having a gear-shifting safety device, a power unit, and a transmission gear wherein said gear-shifting safety device has a gear-shifting mechanism, said gear-shifting mechanism comprises:

a gear-shifting lever;

a gear-shifting hub shaft having an end at which a circumferential step is formed, said circumferential step being provided with a block thereby forming a stop face between said block and said circumferential step;

a gear-shifting hub movably mounted on said gear-shifting hub shaft, said gear-shifting hub forming a position chute that defines a plurality of operation positions including a forward position, a neutral position and a reversing position;

a gear-shifting gear set comprising a shaft on which a plurality of gear-shifting gears and a switching fork guide rod are provided, said gear-shifting gears being of different sizes and having different numbers of teeth engageable with transmission gears of said transmission shaft to generate different gear ratios for output of different torque, said switching fork guide rod forming a switching fork that is fit in said position chute of said gear-shifting hub; and a reversing bar having an end extending out of said power unit to be controlled by a control member for lateral movement, said control member being coupled to a control mechanism which has a rotary knob disposed at a position in vicinity of a body cover of said all-terrain vehicle, an opposite end of said reversing bar being located inside said power unit, said reversing bar having a stop section having an end being wholly positioned on said circumferential step and engageable with said stop face, said reversing bar comprising a resilient element for providing said reversing bar with a resilient return force.

* * * * *